(12) United States Patent
Buckholtz et al.

(10) Patent No.: US 9,296,662 B2
(45) Date of Patent: Mar. 29, 2016

(54) CHEMICAL AGENT FOR REDUCTION OF VECTOR ATTRACTION

(71) Applicants: Harry Buckholtz, Lewiston, NY (US); Ronald Richardson, Hemet, CA (US); Akrum H. Tamimi, Tucson, AZ (US); Charles P. Gerba, Tucson, AZ (US)

(72) Inventors: Harry Buckholtz, Lewiston, NY (US); Ronald Richardson, Hemet, CA (US); Akrum H. Tamimi, Tucson, AZ (US); Charles P. Gerba, Tucson, AZ (US)

( * ) Notice: Subject to any disclaimer, the term of this patent is extended or adjusted under 35 U.S.C. 154(b) by 268 days.

(21) Appl. No.: 13/855,398

(22) Filed: Apr. 2, 2013

(65) Prior Publication Data

US 2014/0290318 A1    Oct. 2, 2014

(51) Int. Cl.
*B01J 8/00* (2006.01)
*C05G 3/00* (2006.01)
*C05F 9/00* (2006.01)
*C05F 3/00* (2006.01)
*C05F 7/00* (2006.01)

(52) U.S. Cl.
CPC ... *C05G 3/00* (2013.01); *C05F 3/00* (2013.01); *C05F 7/00* (2013.01); *C05F 9/00* (2013.01); *Y02P 20/145* (2015.11)

(58) Field of Classification Search
CPC .............. C05G 3/00; C05F 9/00; A61L 11/00
USPC ........................................ 71/11, 12; 422/187
See application file for complete search history.

(56) References Cited

U.S. PATENT DOCUMENTS

| 5,429,750 | A | 7/1995 | Steele |
| 2006/0252828 | A1 | 11/2006 | Ammermann et al. |
| 2007/0084804 | A1 | 4/2007 | Buckholtz et al. |
| 2011/0247985 | A1* | 10/2011 | Theodore ...................... 210/720 |

* cited by examiner

*Primary Examiner* — Kevin Joyner
(74) *Attorney, Agent, or Firm* — Vincent G. LoTempio; Kloss, Stenger & LoTempio; David Stephenson

(57) ABSTRACT

The present invention describes a process involving a new method of use for methyl isothiocyanate (MITC)-generating compounds in the treatment of organic waste material to reduce vector attraction. The present invention results in waste that is more suitable for use as a fertilizer and meets the standard for vector attraction reduction (VAR) as established by the U.S. Environmental Protection Agency. The method includes the application of MITC generating compounds, such as metam sodium, to organic waste material, resulting in the generation of MITC. The MITC generated by the process of the present invention results in a loss of attraction for organic waste material normally experienced by disease-transmitting pests such as flies and rodents.

6 Claims, 4 Drawing Sheets

CHEMICAL AGENT FOR REDUCTION OF VECTOR ATTRACTION

CROSS REFERENCE TO RELATED APPLICATIONS

This application claims the benefit of U.S. Provisional Application of Harry E. Buckholtz and Ronald Richardson, Ser. No. 61/619,301, filed 2 Apr. 2012, having the title CHEMICAL AGENT FOR REDUCTION OF VECTOR ATTRACTION, which is incorporated herein by reference in its entirety.

BACKGROUND OF THE INVENTION

1. Field of the Invention

This disclosure relates generally to a method for treating organic waste material with a methyl isothiocyanate (MITC)-generating compound. More specifically, the present disclosure is a method for reducing the attraction of pest vectors to organic waste material. Organic waste material from sewage, agricultural processes and other sources is a valuable source of fertilizer. Although useful, organic waste material attracts pests that present a hazard to human health. Such pests include flies, rodents and other organisms attracted to the waste as a potential food source or reproductive environment. Once pests come into contact with waste material they may transport pathogens to humans. Thus, pests are considered vectors for the transport of pathogens.

2. Background

Waste material must attain a specified level of Vector Attraction Reduction (VAR) before it can be applied to land for certain purposes, as required by the United States Environmental Protection Agency (EPA) under 40 CFR 503. Various methods are available to treat organic waste to achieve VAR at levels that meet government standards. General descriptions of acceptable methods of VAR can be found in EPA's Environmental Regulations and Technology manual under the heading "Control of Pathogens and Vector Attraction in Sewage Sludge."

Current methods for VAR include alkaline treatment, drying, or covering the waste with soil. Each of these treatments comes with disadvantages. Alkaline treatment generally leaves waste material unsuitable for fertilizer use without further costly treatment. An example of alkaline treatment for VAR can be found in U.S. Pat. No. 5,429,750, which discloses a method for reducing vector attraction by raising the pH of the treated material above 12. Drying waste material to achieve VAR is labor intensive and costly. Burying waste material is labor intensive and requires special equipment that may not be readily available. Therefore, a clear need exists for an economically viable method of treating organic waste that achieves the requisite levels of VAR. MITC-generating compounds have been used as a method to kill pathogens in soil, see U.S. patent application Ser. No. 10/548,075 and U.S. patent application Ser. No. 11/581,715, however MITC-generating compounds are not known to have been used as a method of VAR until the present invention.

SUMMARY OF THE INVENTION

Surprisingly, it has now been found that methyl isothiocyanate can effectively reduce vector attraction to organic waste. The present invention relates to methyl isothiocyanate (MITC) and its use in reducing attraction of animal and insect pests to organic waste material. It is the primary object of this invention to overcome the shortcomings of the aforementioned vector attraction reduction (VAR) methods by providing a commercially viable, low cost method of treating waste material to reduce pest attraction by adding small amounts of an MITC-generating compound to the material.

Another object of the present invention is to provide long-lasting VAR while maintaining the advantages over the aforementioned methods without creating any harmful environmental effects.

It is a further object of the present invention to provide a process that reduces VAR without affecting the beneficial nutrient content of the waste material, thereby rendering the organic wastes in question useful as soil amendments or fertilizers, without the need to further treat the wastes by the aforementioned VAR methods that can, in some cases, negatively impact the beneficial use of waste material.

The objects of the present invention are attained by a process of combining waste material such as wet sewage sludge, used poultry litter, cow or horse manure with one of several compounds capable of generating MITC, such as metam sodium. In one embodiment, the waste material and MITC-generating compound may then be mixed using commercially available mixing equipment.

The present invention provides long lasting VAR, continuing well after MITC has become undetectable by standard analytic methods. Using one embodiment of the method of the present invention, waste material treated with metam sodium for 24 or 48 hours resulted in observably complete VAR for flies and gnats, two of the most common pathogen vectors, over a period of three weeks.

The amounts of MITC generated per ton in the aforementioned example of the present invention present no threat to the environment and result in an effective VAR. No other currently available environmentally sound, commercially viable chemical treatment of organic waste can effectively reduce vector attraction like the present invention.

DESCRIPTION OF THE PREFERRED EMBODIMENTS

The present invention pertains to a method of employing a methyl isothiocyanate (MITC) generating compound to reduce attraction of pest vectors to organic waste material. The present invention, surprisingly, demonstrates that treatment with a MITC-generating compound significantly reduces the attraction of vectors to organic waste material. MITC-generating compounds include metam sodium, chemical salts of monomethyldithiocarbamate, tetrahydro-3, 5-dimethyl-2H-1,3,5-thiadiazine-2-thione or any other MITC-generating compound. In the examples of the present invention herein, the MITC-generating compound is metam sodium (commercially available at 42% sodium N-methyldithiocarbamate). Vectors are defined as living organisms capable of transmitting pathogens present in organic waste material to humans and animals. Examples of vectors involving organic waste include insects, rodents, and birds. Vector Attraction Reduction (VAR) is the process of treating organic waste to reduce its capacity to attract pest vectors.

Figure 1:
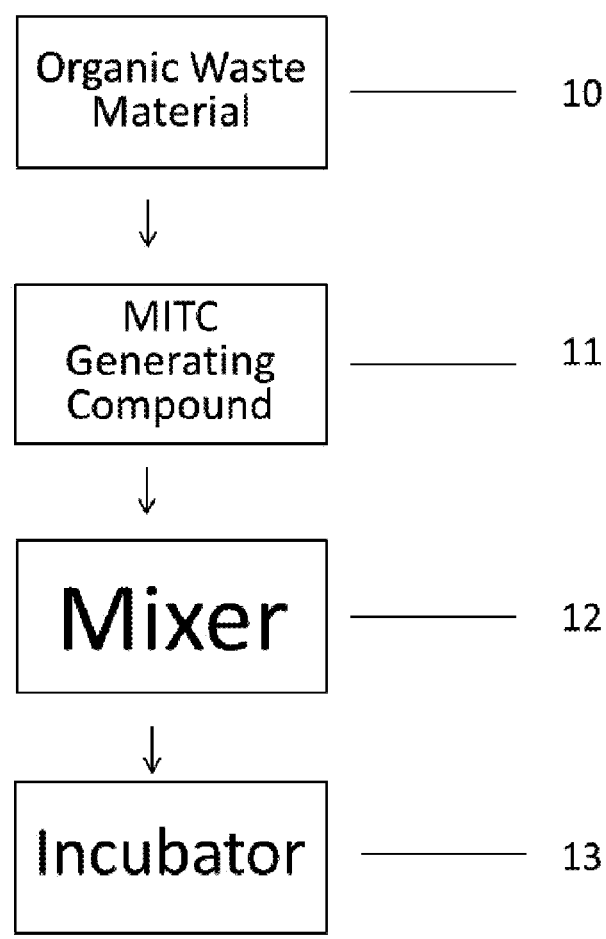
FIG. 1 is a flow chart showing a basic configuration of one of the embodiments of the present invention.

Referring now to FIG. 1, in one embodiment of the present invention, the organic waste material is 10 is treated with a MITC-generating compound 11, such as metam sodium. The MITC-generating compound may be added at 20 gallons per dry ton of waste material. The waste material is then thoroughly mixed 12 with the MITC-generating compound; a time period which may be 15 minutes. Metam sodium converts to MITC in the presence of moisture at temperatures above 10° C., therefore the waste material mixed with the MITC-generating compound is then incubated in an incubation vessel 13 (which may also be the mixing vessel) at a temperature above 10° C., such as room temperature (approximately 24° C.), over a period of time, such as 24 hours, during which time the MITC-generating compound will be converted to MITC in the organic waste material.

Figure 4:
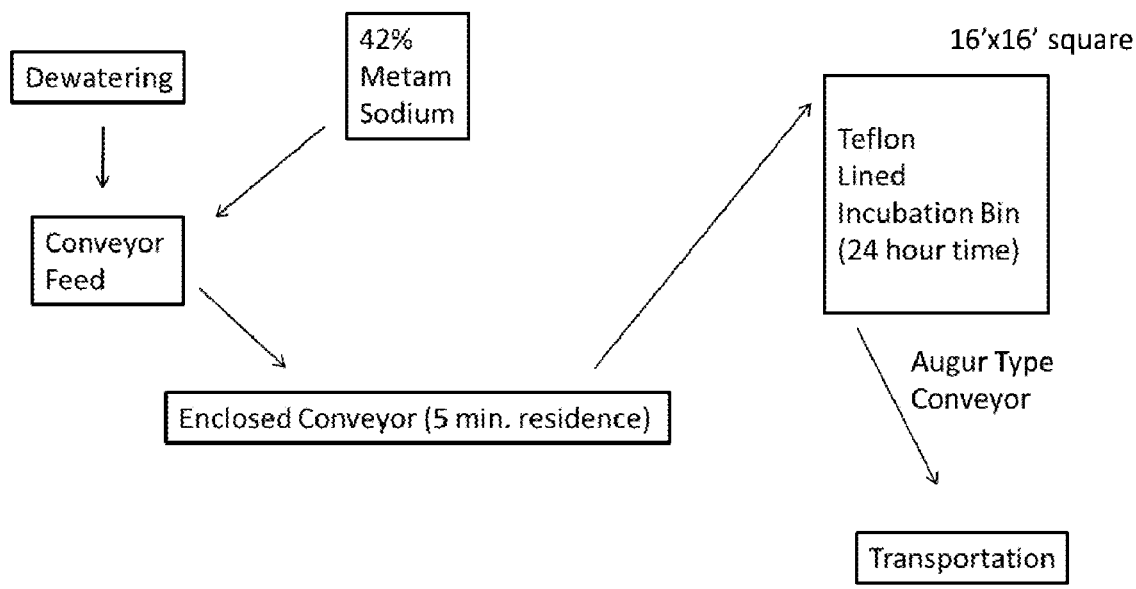
FIG. 4 is one embodiment of the present invention showing a schematic diagram of a prophetic organic waste treatment system.

Referring now to FIG. 4, organic waste is dewatered 100 and placed into a conveyor feed 101. An effective amount of 42% metam sodium 102 is added to the organic waste. The treated waste is then mixed while conveyed 103 to an incubation bin 104 where it will remain for an effective period of time, such as 24 hours, at an effective temperature for conversion of metam sodium to MITC, such as room temperature. A means of conveyance 105 then conveys the treated organic waste material to a means of transportation 106.

Embodiments of the present invention include adding an effective amount (i.e. an amount sufficient to achieve the desired degree of vector attraction reduction) of MITC-generating compound to the material. It has been found that an effective concentration of MITC for the present invention may be achieved by adding about 1-40 gallons of an MITC-generating compound, such as metam sodium, per dry ton of organic waste material is sufficient to achieve the desired VAR, although certain amounts may be more effective than others dependent upon conditions. Ideal amounts of MITC-generating compound may vary dependent upon the nature and liquid content of the waste material to be treated.

invention includes a mixing element. Commercially available mixing equipment, an example of which would be the Roto-Mix, is suitable for this purpose.

Examples of the type of organic waste material that can be treated by the present invention include, but are not limited to, wet sewage sludge, used poultry litter, cow or horse manure. For example, in some embodiments of the invention, sludge or other organic wastes that contain higher percentages of solids in the ranges of >33 percent may also be treated with the described process of mixing the MITC-generating substance with the solids in mixing equipment to achieve vector attraction reduction. This is often advantageous when treating such materials including, but not limited to, poultry litter, partially dried manures and food wastes. The process is also effective when treating more dilute solids, typically in the range of 2-5% dry solids. In this case, when the solids are released to permeable soil to drain, the residual solids will be non-vector attracting due to the prior treatment with an MITC-generating compound.

The time for treating organic waste material required by the present invention may vary depending upon the application. However, as demonstrated in example 1, below, varying combinations of reaction time and amount of MITC-generating compound added can achieve the desired result of VAR.

EXAMPLE 1

Five bottles were filled with raw wastewater sludge cake. Total solids measurements were performed on the sludge. The bottles were weighed and the weight of the sludge in each bottle was determined. Metam sodium (42% aqueous solution) (AM-VAC Chemical Corporation) was added to 4 of the five bottles and the fifth bottle received no treatment serving as a control. Metam sodium loading rate of 20 gallons per dry ton was used on two of the bottles, while the other two bottles were treated with 40 gallons of Metam sodium per dry ton.

The contents of the treated bottles were mixed for over 15 minutes. The untreated bottle was kept at 4° C. to eliminate sludge digestion while the 4 treated bottles were left at room temperature (~24° C.). After 24 hours, one of the bottles treated with 20 gallons Metam sodium per dry ton and one of the bottles treated with 40 gallons Metam sodium per dry ton were placed at 4° C. stopping the treatment effects of MITC. After 48 hours, the remaining 2 bottles kept at room temperature were stored at 4° C. stopping treatment of sludge by MITC. Table 1 shows the weights of sludge for each bottle and Metam sodium loading rates used for the treatment.

TABLE 1

| Sample ID* | Bottle Weight (g) | Bottle and Sludge Weight (g) | Sludge Weight (g) | Metam sodium Rate (Gallons per Dry Ton) |
|---|---|---|---|---|
| VAR 00 20 | 207.0 | 1,245.1 | 1,038.1 | 0 |
| VAR 24 20 | 208.0 | 1,246.6 | 1,038.6 | 20 |
| VAR 24 40 | 208.6 | 1,477.9 | 1,269.3 | 40 |
| VAR 48 20 | 206.1 | 1,236.0 | 1,029.9 | 20 |
| VAR 48 40 | 209.9 | 1,208.6 | 998.7 | 40 |

*VAR: Vector Attraction Reduction;
Time: 0, 24 or 48 hours;
Metam sodium Rate: 0, 20 or 40 (gallons/dry Ton)

Organic waste treated according to the method of the present invention has been achieved by mixing, as described in below, although other methods of applying the MITC-generating compound to organic waste material, such as spreading, are included as part of the present invention. In one embodiment of the present invention, the structure of the About 50 grams sludge was obtained in sterile bottles from each sample shown in table 1 for analysis of chemical properties. Chemical properties were conducted at the Water Quality Center at the University of Arizona. All sludge samples (treated and untreated) were taken back to the Green Valley WTF and were placed in drying bed number 5. Observations were conducted on daily basis for 3 weeks. The results of observations conducted for 3 weeks on the 5 samples placed in drying bed number 5 are shown in Table 2.

TABLE 2

| Sample ID* | Observations |
|---|---|
| VAR 00 20 | Many flies visible landing on the pile. When pile was opened, a small cloud of gnats came out |
| VAR 24 20 | Flies occasionally landed on the pile but left quickly. Few gnats were observed when pile was opened |
| VAR 24 40 | Flies occasionally landed but left quickly. No gnats were observed when the pile of sludge was opened |
| VAR 48 20 | Flies occasionally landed but left quickly. No gnats were observed when the pile of sludge was opened |
| VAR 48 40 | Flies occasionally landed but left quickly. No gnats were observed when the pile of sludge was opened |

*VAR: Vector Attraction Reduction; Time: 0, 24 or 48 hours; Metam sodium Rate: 0, 20 or 40 (gallons/dry Ton)

Results for chemical analysis are shown in Table 3.

TABLE 3

| Sample ID | Metam (Gal/Dry Ton) | Metam (ppm) | Treatment Time (Hours) | Total Nitrogen (%) | Ammonium $NH_4^+$ (%) | Total Carbon (%) | Total Organic Carbon (%) | Total Mg (%) | Total Ca (%) | Total K (%) | Total P (%) |
|---|---|---|---|---|---|---|---|---|---|---|---|
| VAR00 | 0 | 0 | 0 | 8.53 | 0.49 | 45.95 | 42.32 | 0.25 | 1.69 | 0.28 | 1.51 |
| VAR2420 | 20 | 23,800 | 24 | 8.18 | 0.48 | 44.97 | 35.57 | 0.26 | 1.81 | 0.29 | 1.50 |
| VAR2440 | 40 | 47,600 | 24 | 7.72 | <0.01 | 44.05 | 41.80 | 0.26 | 1.74 | 0.29 | 1.43 |
| VAR00 | 0 | 0 | 0 | 8.53 | 0.49 | 45.95 | 42.32 | 0.25 | 1.69 | 0.28 | 1.51 |
| VAR4820 | 20 | 23,800 | 48 | 8.14 | 0.40 | 45.40 | 42.41 | 0.25 | 1.83 | 0.30 | 1.62 |
| VAR4840 | 40 | 47,600 | 48 | 7.90 | <0.01 | 43.19 | 40.74 | 0.25 | 1.73 | 0.29 | 1.38 |

Figure 2A:
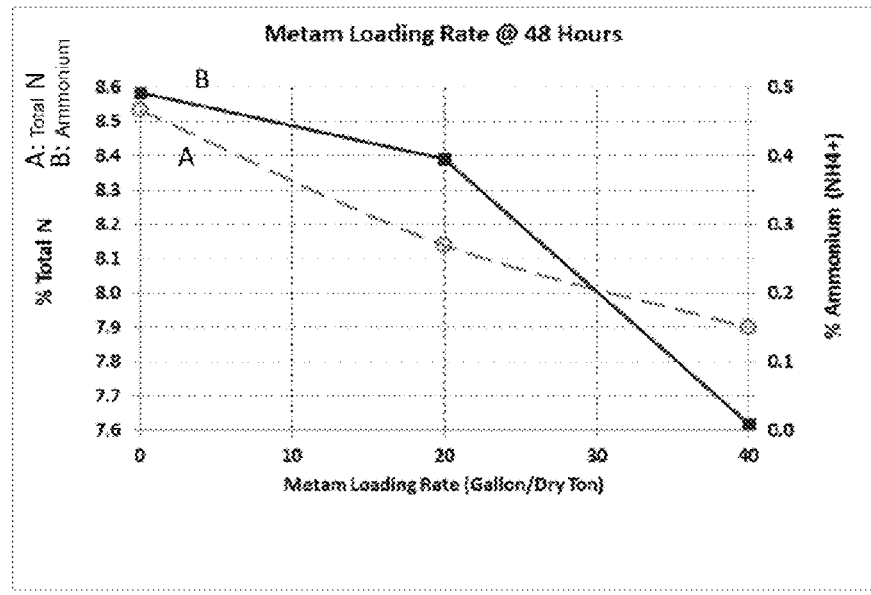
FIG. 2A reflects the decrease of Ammonium with treatment time and with Metam sodium loading rate where the points on the graph represent 0, 20 and 40 gallons of metam sodium per dry ton of sewage sludge sampled at 24 hours after treatment.
Figure 2B:
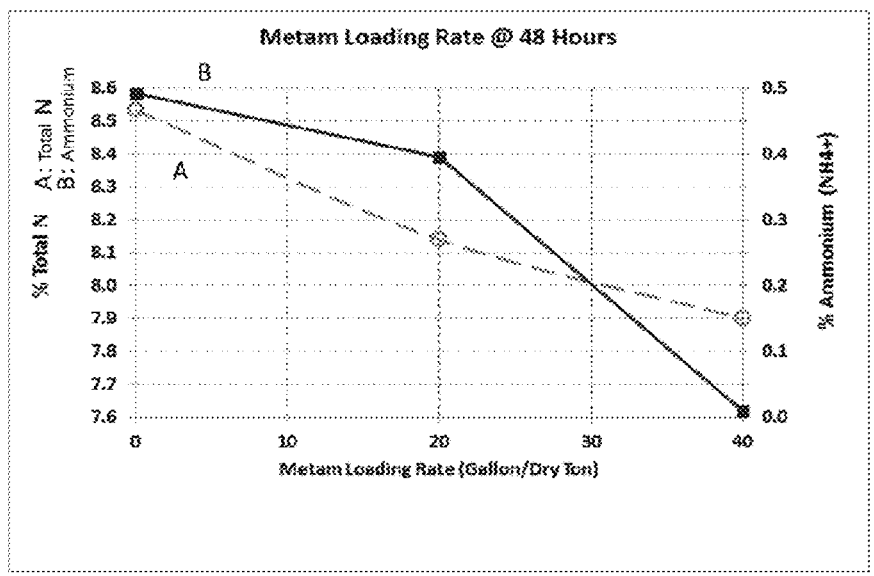
FIG. 2B reflects the decrease of Ammonium with treatment time and with Metam sodium loading rate where the points on the graph represent 0, 20 and 40 gallons of metam sodium per dry ton of sewage sludge sampled at 48 hours after treatment.
Figure 3A:
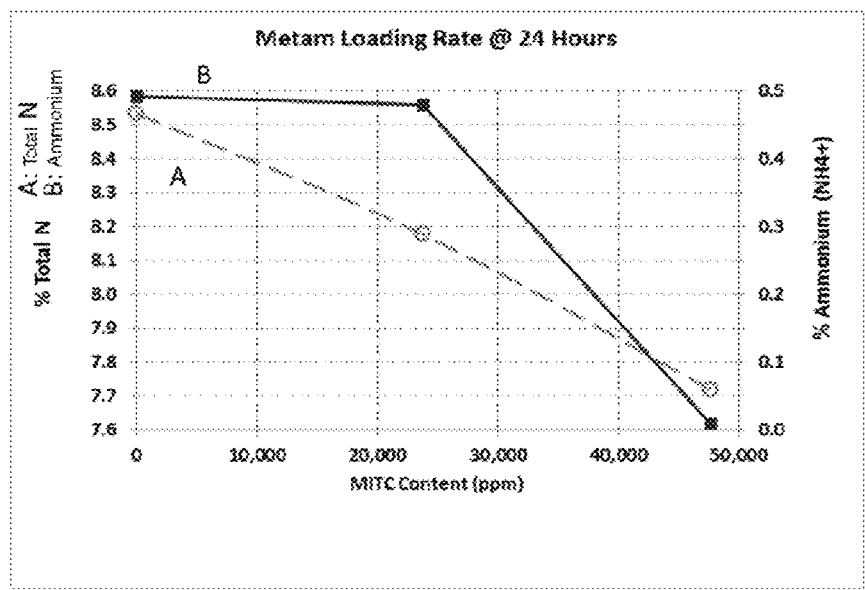
FIG. 3A reflects the decrease of Ammonium with treatment time and with MITC content in the treatment bottle at 24 hours.
Figure 3B:
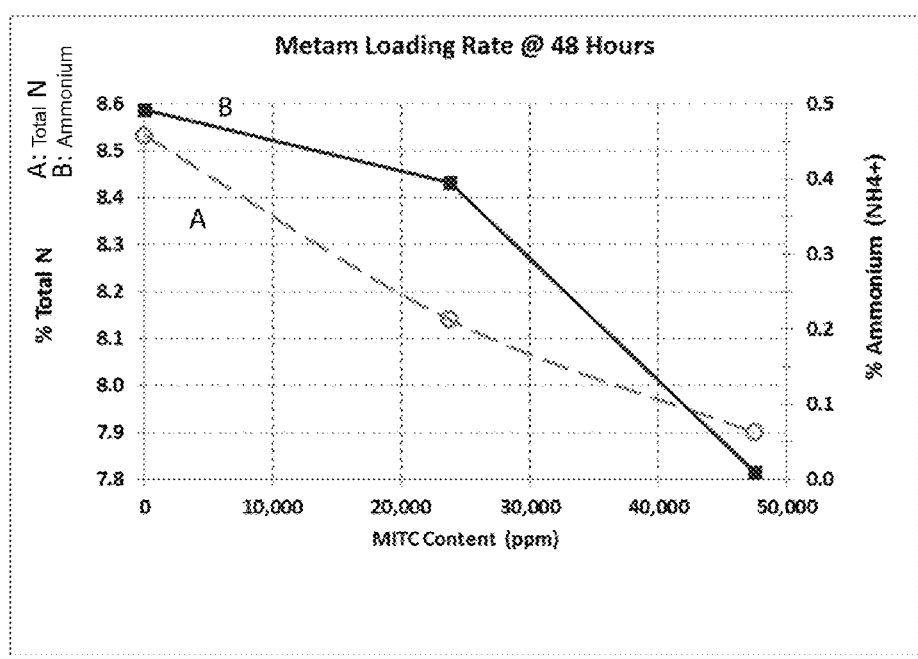
FIG. 3B reflects the decrease of Ammonium with treatment time and with MITC content in the treatment bottle at 48 hours.

Results shown in Table 3 indicate that there is no significant change between the nutrient values for the different treatments and those of the control except for the Ammonium. Ammonium percentages based on dry weight measured at the 24 and 48 hours treatments for Metam sodium loading rate of 40 gallons per dry ton are below detection limit are shown. It should be noted that during the analytical drying process after these measurements were taken the reaction may continue and further reduction in Ammonium is likely to occur. FIGS. 2A and 2B reflect the decrease of Ammonium (B) with treatment time, relative to total Nitrogen (A), and with Metam sodium loading rate; while FIGS. 3A and 3B reflect the decrease of Ammonium (B) with treatment time, relative to total Nitrogen (A), and with MITC content in the treatment bottle.

The surprising results of Example 1 demonstrate that MITC-generating compounds, when used by the method of the present invention, effectively create vector attraction reduction without depleting the nutrient content of organic waste material; leaving it in a condition fit for use as a soil additive or fertilizer.

EXAMPLE 2

A mixture of poultry waste was treated with aqueous metam sodium containing 42% active ingredient (Tradename "Rid-A-Vec™") in a mixing unit. The waste mixture contained 70% poultry litter, 25% dissolved air flotation chicken fat (DAF) and 5% hatchery waste, which is composed of chicken carcasses and broken eggs. The overall waste composition contained about 60% solids and 40% water.

About 18,000 pounds of this mixture was loaded into the mixing unit. Three gallons of 42% metam sodium (12.7 pounds of active ingredient) was metered through spray nozzles on the circulating mixture within the mixer. Mixing continued for about 5 minutes to allow the metam sodium to be converted to methyl isothiocyanate (MITC). The theoretical concentration of MITC generated from the liquid metam sodium was 405 parts per million.

After a 5 minute mixing time, the mixture was transported to an outdoor area and deposited "windrow" fashion in more or less triangular configuration approximately 6 feet at the base with a 4-foot height. pH of the treated material was about 6.8. The length of the triangular shaped discharge was about 37 feet. The metam sodium-treated materials were located in close proximity (less than 10 feet) to large volumes of untreated poultry litter and combinations of litter, DAF, and hatchery waste awaiting composting. Numerous varieties of flies were in large concentrations at the waste impounding site as a result of attraction to the untreated waste. Additions of fresh waste were continuously brought to the impounding site. Flies readily landed on the untreated wastes, both consuming the material and laying eggs in it. However, the flies completely avoided the metam sodium treated waste. Avoidance continued permanently, even after the treated material no longer showed evidence of the presence of MITC, as evidenced by a lettuce seed germination test.

A lettuce seed germination test qualitatively measures the presence of MITC due to the phytotoxicity of the compound. Samples of the treated waste were taken from the center of the treated pile at various times from zero hours after mixing to 24 hours. The samples were mixed with moist potting soil and deposited along with lettuce seeds in tightly capped containers and exposed to sunlight. Replicated tests showed that samples taken prior to 24 hours resulted in the enclosed lettuce seeds failing to germinate. However, lettuce seeds germinated in the presence of metam sodium-treated waste that had been allowed to remain in the treated pile for 24 hours prior to sampling, giving evidence that the original MITC concentration was very low to non-detectable. Nevertheless, flies avoided the treated waste indefinitely (greater than ten days) beyond the 24-hour period. In conjunction with the results from Example 1, these results are surprising in that VAR occurs when MITC is undetectable in the soil. This suggests that MITC is not the direct cause of the VAR; rather MITC chemically interacts with a component of the waste to render it no longer attractive to pests.

What is claimed is:
1. A method of treating organic waste material for vector attraction reduction comprising:
   a. adding to said organic waste material between 20 and 40 gallons of 42% sodium N-methyldithiocarbamate per dry ton of organic waste material;

wherein sodium N-methyldithiocarbamate is the only compound being added to the organic waste material;
b. combining the 42% sodium N-methyldithiocarbamate with said organic waste material;
c. incubating the combination of the 42% sodium N-methyldithiocarbamate and the organic waste material;
wherein the combination of the 42% sodium N-methyldithiocarbamate and the organic waste material acquires an observable vector attraction reduction;
wherein vector attraction reduction persists after an MITC level becomes low to undetectable in the combination of the 42% sodium N-methyldithiocarbamate and the organic waste material.

2. The method of claim 1 wherein the means of combining the 42% sodium N-methyldithiocarbamate with the organic waste material is mixing.

3. The method of claim 1 wherein the means of combining the 42% sodium N-methyldithiocarbamate with the organic waste is spreading.

4. The method of claim 1 further comprising:
a. dewatering said organic waste material prior to adding the 42% sodium N-methyldithiocarbamate;
c. mixing the 42% sodium N-methyldithiocarbamate with the organic waste material;
d. conveying the organic waste mixed with the 42% sodium N-methyldithiocarbamate to a means for incubating the organic waste material;
e. incubating the organic waste material mixed with the 42% sodium N-methyldithiocarbamate for an effective period of time at an effective temperature;
f. means for conveying the organic waste material from the means for incubation to a means for transporting the organic waste material.

5. The method of claim 1 where the organic waste is comprised of wastewater sludge.

6. The method of claim 1 wherein the organic waste material is sewage sludge.

* * * * *